(12) United States Patent
Sigalas et al.

(10) Patent No.: US 6,728,457 B2
(45) Date of Patent: Apr. 27, 2004

(54) WAVEGUIDES IN TWO DIMENSIONAL SLAB PHOTONIC CRYSTALS WITH NONCIRCULAR HOLES

(75) Inventors: Mihail M. Sigalas, Santa Clara, CA (US); Kai Cheung Chow, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/192,300

(22) Filed: Jul. 10, 2002

(65) Prior Publication Data

US 2004/0008962 A1 Jan. 15, 2004

(51) Int. Cl.[7] .............................. G02B 6/26; G02F 1/00
(52) U.S. Cl. ...................... 385/125; 385/15; 385/39; 385/50; 359/321
(58) Field of Search ......................... 385/15, 27, 29, 385/39, 50, 123, 125, 129; 359/245, 321, 322

(56) References Cited

U.S. PATENT DOCUMENTS 6,483,640 B1 * 11/2002 Tonucci et al. ............. 359/361
6,643,439 B2 * 11/2003 Notomi et al. .............. 385/125
2002/0048422 A1    4/2002 Cotteverte et al.
2003/0174993 A1 *  9/2003 Tomaru ....................... 385/129
2003/0202764 A1 * 10/2003 Lee et al. .................... 385/129

OTHER PUBLICATIONS

Johnson, S.G. et al., "Linear Waveguides in Photonic–Crystal Slabs", Physical Review B, vol. 62, No. 12, Sep. 15, 2000, pp. 8212–8221.

Johnson, S. G. et al., "Guided Modes in Photonic Crystal Slabs", Physical Review B, vol. 60, No. 8, Aug. 15, 1999, pp. 5751–5758.

* cited by examiner

Primary Examiner—Hemang Sanghavi
(74) Attorney, Agent, or Firm—Juergen Krause Polstorff

(57) ABSTRACT

A two-dimensional photonic crystal slab apparatus having a waveguiding capability is provided. Noncircular holes are introduced to replace the circular holes in the two-dimensional lattice of the photonic crystal to provide waveguiding capability. High guiding efficiency is achieved over a wide frequency region within the photonic bandgap.

18 Claims, 20 Drawing Sheets

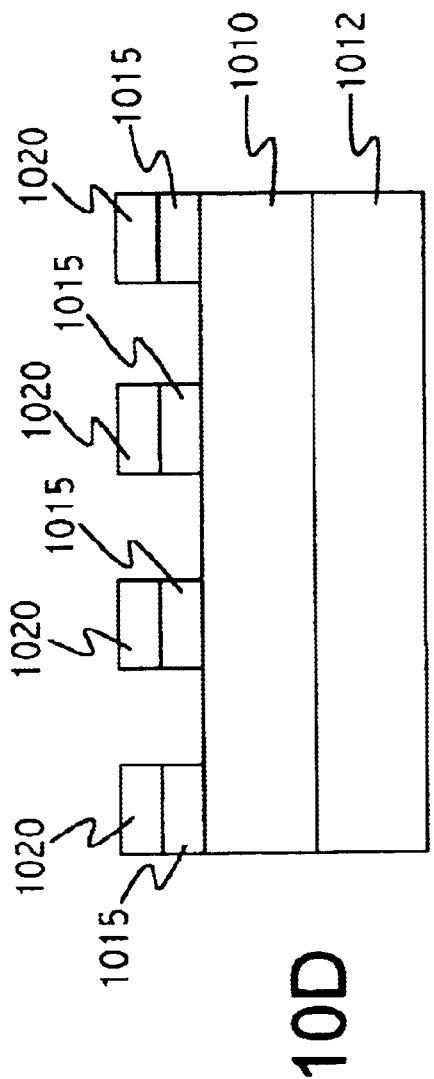
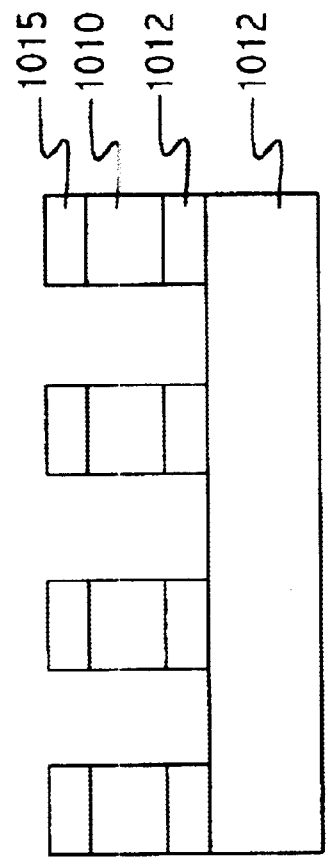
FIGURE 10D
FIGURE 10E

WAVEGUIDES IN TWO DIMENSIONAL SLAB PHOTONIC CRYSTALS WITH NONCIRCULAR HOLES

FIELD OF INVENTION

The present invention relates generally to the field of photonic crystals and more particularly to two-dimensional photonic crystal apparatus.

BACKGROUND OF INVENTION

Photonic crystals (PC) are periodic dielectric structures which can prohibit the propagation of light in certain frequency ranges. Photonic crystals have spatially periodic variations in refractive index and with a sufficiently high contrast in refractive index, photonic bandgaps can be opened in the structure's optical spectrum. The "photonic bandgap" is the frequency range within which propagation of light through the photonic crystal is prevented. A photonic crystal that has spatial periodicity in three dimensions can prevent light having a frequency within the crystal's photonic bandgap from propogating in any direction. However, fabrication of such a structure is technically challenging. A more attractive alternative is to utilize photonic crystal slabs that are two-dimensionally periodic dielectric structures of finite height that have a band gap for propagation in the plane and use index-confinement in the third dimension. In addition to being easier to fabricate, two-dimensional photonic crystal slabs provide the advantage that they are compatible with the planar technologies of standard semiconductor processing.

An example of a two-dimensional photonic crystal structure periodic in two dimensions and homogeneous in the third may be fabricated from a bulk material having a periodic lattice of circular air filled columns extending through the bulk material in the height direction and periodic in the planar direction. The propagation of light in two-dimensional photonic crystals is determined by a number of parameters, including radius of the cylindrical columns, the lattice spacing, the symmetry of the lattice and the refractive indices of the bulk and column material.

Introducing defects in the periodic structure of a photonic crystal allows the existence of localized electromagnetic states that are trapped at the defect site and that have resonant frequencies within the bandgap of the surrounding photonic crystal material. By providing a line of such defects in the photonic crystal, a waveguiding structure is created that can be used in the control and guiding of light (see, for example, J. D. Joannopoulos, R. D. Meade, and J. N. Winn, "Photonic Crystals", Princeton University Press, Princeton, N.J., 1995). Light of a given frequency that is prevented from propagating in the photonic crystal may propagate in the defect region.

A two-dimensional photonic crystal slab waveguide usually comprises a two-dimensional periodic lattice in the form of an array of dielectric rods or air holes incorporated in a slab body. High guiding efficiency can be achieved only in a narrow frequency region close to the upper or lower edge (for dielectric rods or air holes, respectively) of the waveguide band, where there are no leaky modes. Typically, high guiding efficiency is achieved only in a narrow frequency region that is only a few percent of the center frequency of the waveguide band and existing configurations suffer from low group velocities in the allowed waveguide band. Low group velocity increases the unwanted effects of disorder and absorption. (see S. G. Johnson, S. Fan, P. R. Villeneuve, L. Kolodziejski and J. D. Joannopoulos, Phys. Rev. B 60,5751, 1999 and S. G. Johnson, P. R. Villeneuve, S. Fan and J. D. Joannopoulos, Phys. Rev. B 62,8212,2000).

FIG. 1 shows an xy view of prior art two-dimensional photonic crystal slab apparatus 100. Photonic crystal slab 115 has circular holes 110 arranged to from a periodic triangular lattice with a lattice spacing equal to a. Circular holes 110 are filled with air. Region of defects 125 is created by replacing circular holes 110 of the lattice with larger circular holes 120 along a line in the x direction. Ridge waveguide 175 couples light into photonic crystal slab apparatus 100 that may have its edge at line A', line B' or line C' in FIG. 1.

FIG. 2 shows the transmission coefficient for two-dimensional crystal slab apparatus 100 as a function of frequency expressed in fractions of c/a—where c—is the speed of light—and a is the lattice spacing. The radius for circular holes 120 is about 0.45 a and the radius for circular holes 110 is about 0.3 a. Curve 210 represents the unguided case which has low transmission in the bandgap and high transmission in the allow band. Curve 201 represents the case where ridge waveguide 175 is attached to photonic crystal slab 15 at the edge defined by line A in FIG. 1. Curve 202 represents the case where ridge waveguide 175 is connected to photonic crystal slab 115 at the edge defined by line B in FIG. 1. Curve 203 represents the case where ridge waveguide 175 is connected to photonic crystal slab 115 at the edge defined by line C' in FIG. 2. The transmission for curve 203 is a maximum for a frequency of about 0.253 c/a and the waveguide band is narrow. Increasing the radius of circular holes 120 to 0.5 a causes circular holes 120 to touch and start to overlap. This results in rapid deterioration of the transmission properties of two-dimensional crystal slab apparatus 100 as the light wave becomes less confined due to the decrease of the average dielectric constant of two-dimensional crystal slab 100.

SUMMARY OF INVENTION

In accordance with the invention, noncircular holes such as elliptical holes or rectangular holes are introduced as defects in the guiding direction of the photonic-crystal slab to create wide wave guiding bands covering more than 10% of the center frequency portion of the waveguide band. The elliptical or rectangular holes form a line of defects in the photonic crystal slab. Because low group velocities occur at the edges of the waveguide bands where the band becomes flat there is a wider range of frequencies with high group velocities available. Elliptical and rectangular holes provide significantly wider waveguide bandwidth and higher group velocity than circular holes. Over 10% of guiding bandwidth is achieved for a wide range of elliptical and rectangular shapes. The presence of a wider range of operating frequencies gives more forgiving fabrication tolerance for practical waveguide and allows more design flexibility when stub tuners, add-drop filters, bends and splitters are added. Higher group velocity will also lower the propagation loss of the waveguide.

BRIEF DESCRIPTION OF THE DRAWINGS

FIG. 10b shows an e-beam resist mask layer applied to the initial structure of FIG. 10a.

FIG. 10d shows the structure after etching of the $SiO_2$ layer to form a mask for subsequent etching of the silicon layer.

FIG. 10e shows the completed structure after etching in accordance with the invention.

FIG. 11b shows an e-beam resist layer applied to the initial structure of FIG. 10a.

DETAILED DESCRIPTION OF THE INVENTION

Figure 3:
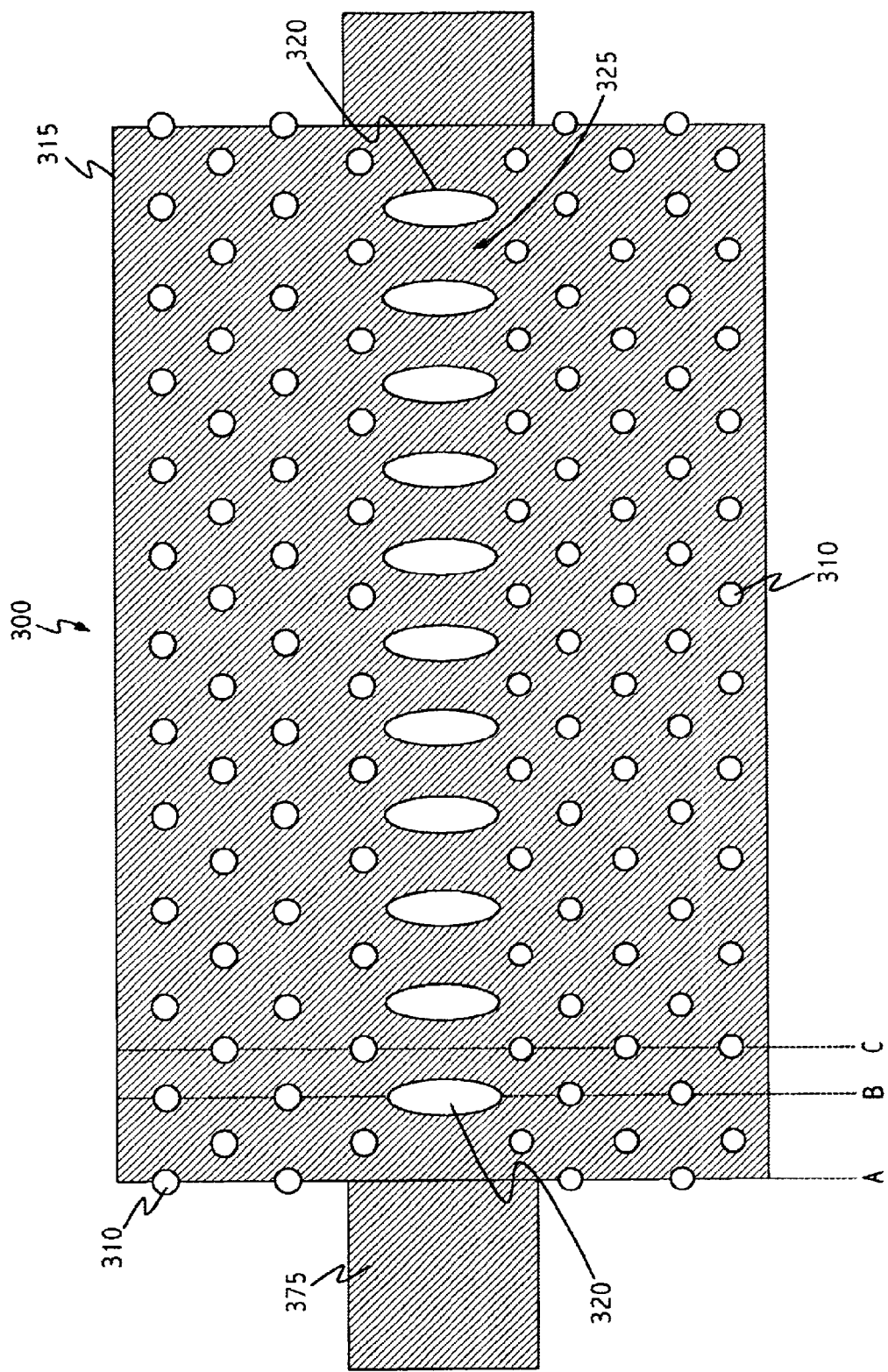
FIG. 3 shows a view of a two-dimensional photonic crystal slab apparatus in accordance with the invention.

FIG. 3 shows the xy view of typical two-dimensional photonic crystal slab apparatus 300 in an embodiment in accordance with the invention. Photonic crystal slab 315 has circular holes 310 arranged to form a periodic triangular lattice. A periodic honeycomb lattice may also be used. Circular holes 310 are etched through photonic crystal slab 315 and are typically filled with a low dielectric constant material such as air. A high dielectric contrast is typically required to open a bandgap in the xy plane. In accordance with the invention, region of defects 325 is created by replacing circular holes 310 of the lattice with elliptical holes 320 along a line, for example, in the x direction. Elliptical holes 320 are typically filled with the same dielectric material as circular holes 110. Ridge waveguide 375 couples light into photonic crystal slab apparatus 300 that may have its edge at line A, line B or line C in FIG. 3.

Figure 1:
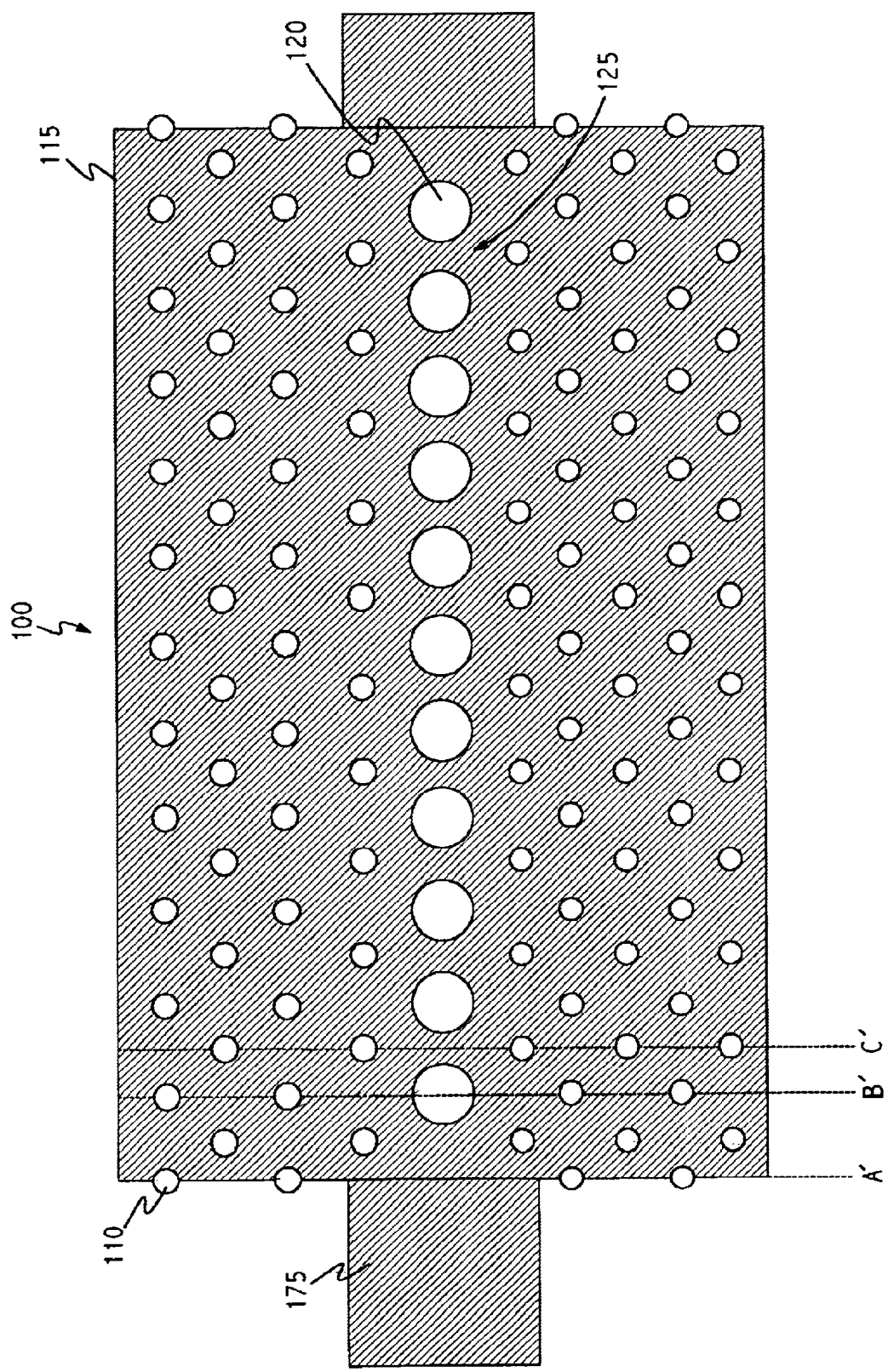
FIG. 1 shows a view of a prior art two-dimensional photonic crystal slab apparatus.
Figure 2:
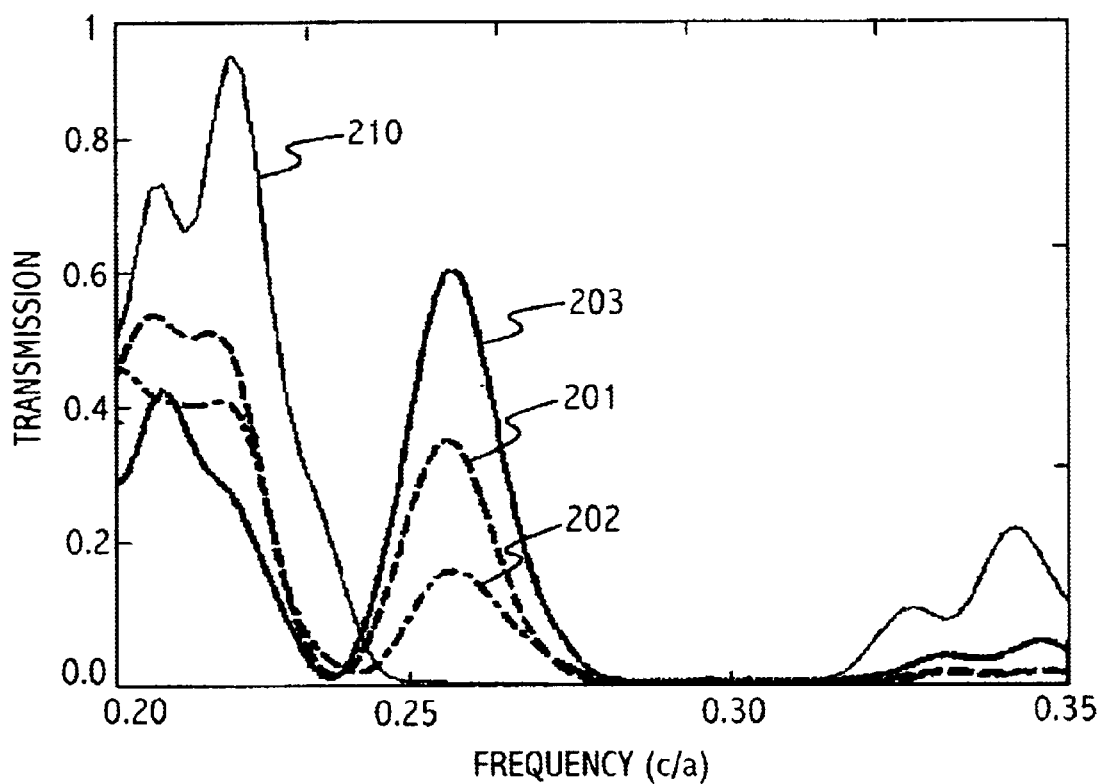
FIG. 2 shows a transmission versus frequency graph for the prior art apparatus of FIG. 1.
Figure 4:
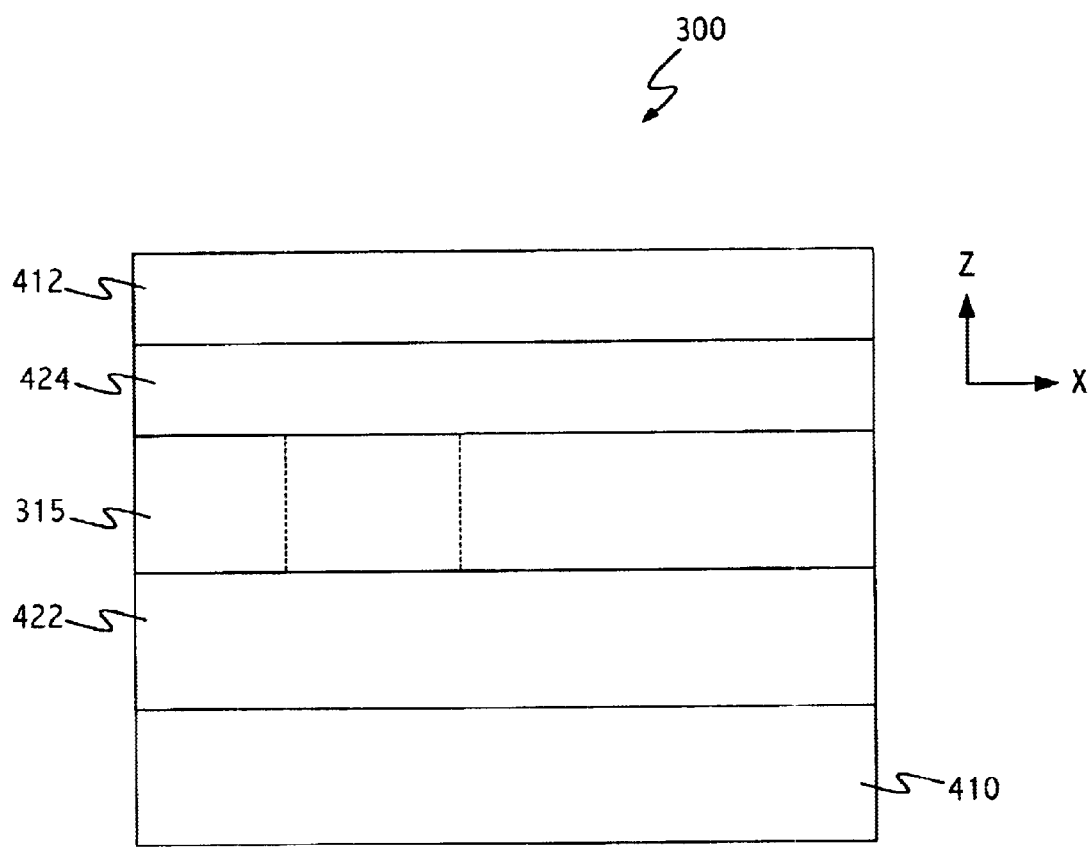
FIG. 4 shows a side view of a two-dimensional photonic crystal slab apparatus in accordance with the invention.

FIG. 4 shows an xz cross-sectional view of photonic crystal slab apparatus 300. Photonic crystal slab 315 is sandwiched between cladding layer 422 and cladding layer 424. Typically, cladding layer 422 is positioned between substrate layer 410 and photonic crystal slab 315 (see FIG. 2). Typically, photonic crystal slab 315 is made from a material having a high dielectric constant compared to air such as silicon or a III-V based semiconductor. To provide index confinement in the z direction, cladding layers 422 and 424 are typically $SiO_2$ or other material having a lower dielectric than the material of photonic crystal slab 315. Substrate layer 410 is typically of the same material as photonic crystal slab 315 to provide mechanical support but may also be air. Layer 412 positioned over cladding layer 424 is typically air.

Photonic crystal slab apparatus 300 is capable of transmitting light having a frequency that lies within the bandgap of photonic crystal slab 315 in a straight line. The waveguide band for photonic crystal slab apparatus 300 depends on a number of factors. Increasing the thickness of photonic crystal slab 315 while keeping all other parameters constant increases the effective dielectric constant and shifts the waveguide band of photonic crystal slab apparatus 300 to lower frequencies. Increasing the cross-section of circular holes 310 while keeping all other parameters constant decreases the effective dielectric constant and shifts the waveguide band of photonic crystal slab apparatus 300 to higher frequencies.

Increasing the thickness of cladding layers 422 and 424 shifts the position of the waveguide band. If layers 412 and 410 are air, increasing the thickness of cladding layers 422 and 424 slowly moves the position of the waveguide band to lower frequencies and saturates where further increases in thickness produce no further shift in waveguide band position. On the other hand, if layer 410 is not air but, for example, silicon, the position of the waveguide band moves to higher frequencies as cladding layers 422 are increased in thickness and saturates where further increases in thickness produce no further shift in waveguide band position.

A finite difference time domain method is used to simulate the performance of photonic crystal slab apparatus 300. In the simulation, ridge waveguide 375 couples the light into photonic crystal slab 315. Photonic crystal slab is taken to have a typical thickness of about 0.6 a. A complete line of circular holes 310 is removed along the x direction and replaced by elliptical holes 320. For calculations, the lattice constant is fixed. For example, if a waveguide band is theoretically indicated to exist at a value of about $a/\lambda=0.26$ and the wavelength to be transmitted is about 1.55 microns then the lattice constant a is chosen to be about 0.4 microns. In the calculations, a dielectric slab of thickness of 0.6 a and dielectric constant of 12.96 is used. The slab is placed on top of a semi-infinite thick material of dielectric constant of 2.

The ridge waveguide used to couple light to the photonic crystal is 2.28 a wide.

Figure 5:
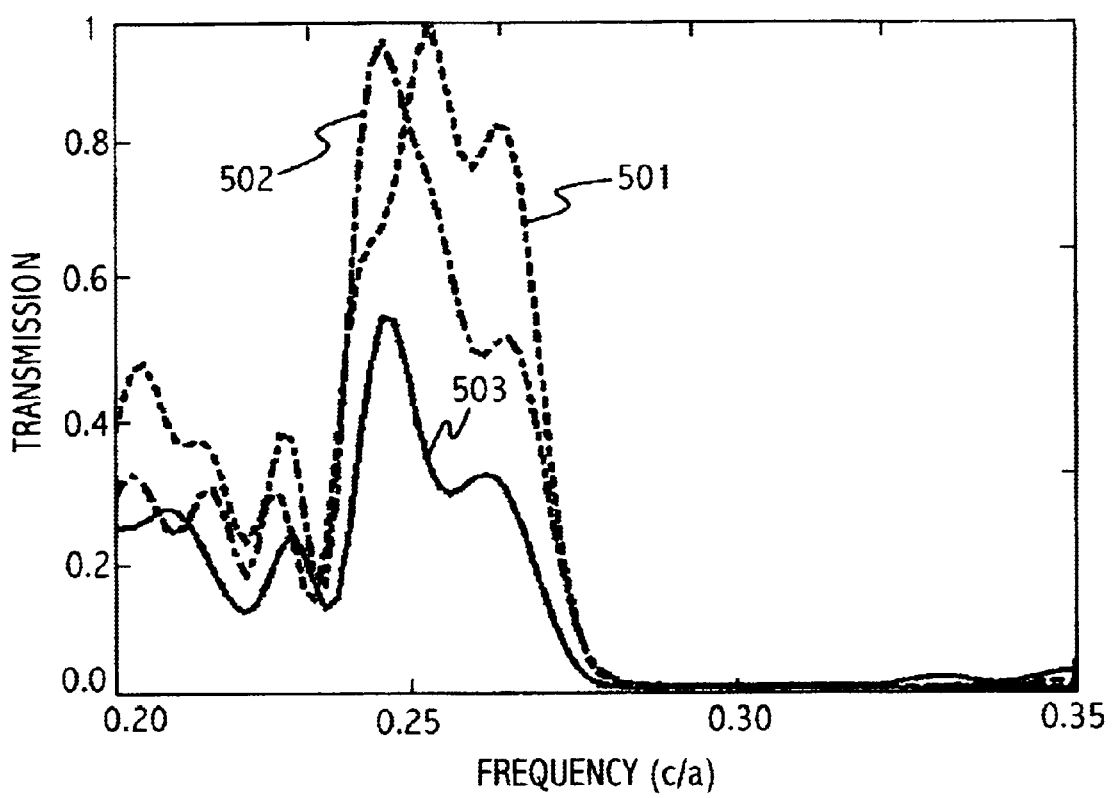
FIG. 5 shows a transmission versus frequency graph for a two-dimensional photonic crystal slab apparatus in accordance with the invention.

For the plots shown in FIG. 5, elliptical holes 320 have semiminor axis of about 0.33 a and a semimajor axis of about 0.74 a where a is the lattice constant. Circular holes 310 have a radius of about 0.3 a. Curve 501 shows transmission versus frequency for the case where ridge waveguide 375 contacts photonic crystal slab 315 at the left edge defined by line A (see FIG. 3). Curve 502 shows transmission versus frequency for the case where ridge waveguide 375 contacts photonic crystal slab 315 at a left edge defined by line B (see FIG. 3). Curve 503 shows transmission versus frequency for the case where ridge waveguide 375 contacts photonic crystal slab 315 at a left edge defined by line C (see FIG. 3). It is apparent from the plots in FIG. 5 that it is not desirable to couple to photonic crystal slab 315 along an edge defined by line C for the case of elliptical holes having a minor axis of about 0.33 a. The choice of whether to couple ridge waveguide 375 at line A or line B depends on the frequency of the light to be transmitted. For frequencies in a narrow band less than about 0.245 c/a, curve 502 indicates bettertransmission, while curve 501 indicates better transmission for frequencies between about 0.25 c/a to about 0.275 c/a. For all the cases in FIG. 5, left and right interface between the ridge waveguide and the photonic crystal are the same.

Figure 6A:
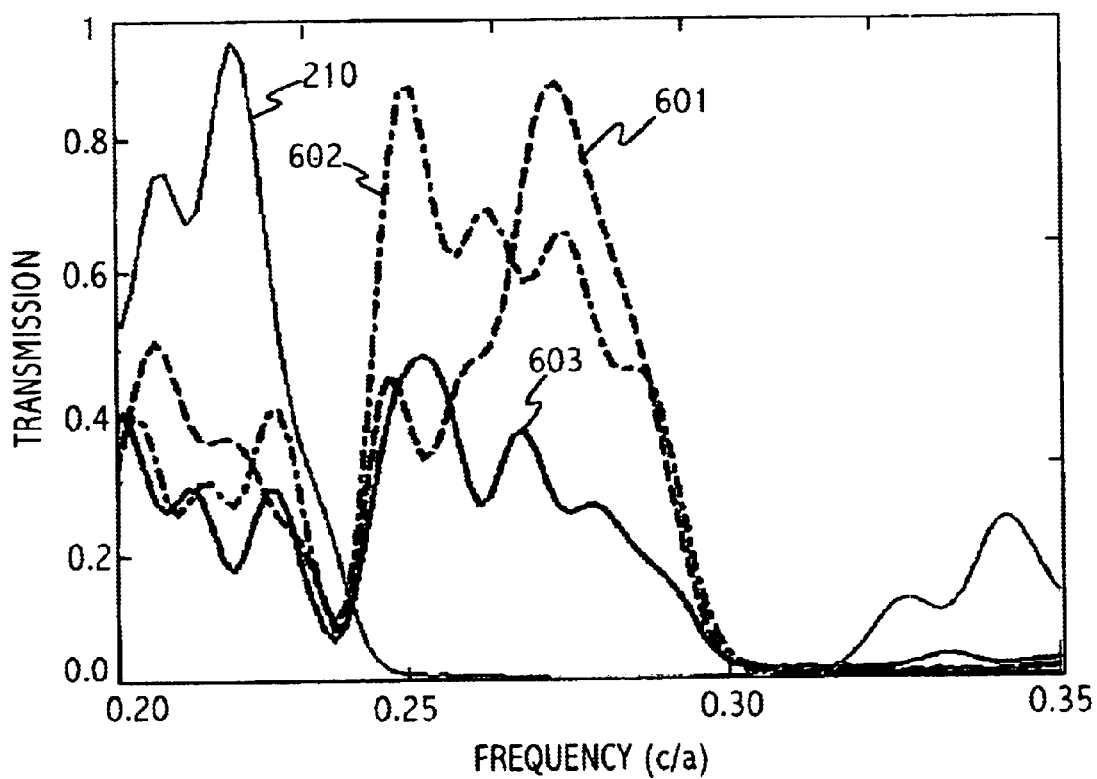
FIG. 6a shows a transmission versus frequency graph for a two-dimensional photonic crystal slab apparatus in accordance with the invention.

For the plots shown in FIG. 6a, elliptical holes 320 have a semiminor axis of about 0.37 a and a semimajor axis of about 0.738 a where a is the lattice constant. Circular holes 310 have a radius of about 0.3 a. The width of the waveguide band is about 0.176 of the mid-band frequency. Curve 601 shows transmission versus frequency for the case where ridge waveguide 375 contacts photonic crystal slab 315 at the left edge defined by line A (see FIG. 3) and provides a maximum transmission of about 0.89 at the lower edge of the waveguide band. Curve 602 shows transmission versus frequency for the case where ridge waveguide 375 contacts photonic crystal slab 315 at a left edge defined by line B (see FIG. 3) and provides a maximum transmission of about 0.89 at the upper edge of the waveguide band. Curve 603 shows transmission versus frequency for the case where ridge waveguide 375 contacts photonic crystal slab 315 at a left edge defined by line C (see FIG. 3) and provides a maximum transmission of about 0.5. It is apparent from the plots in FIG. 6a that it is not advantageous to couple to photonic crystal slab 315 along an edge defined by line C for the case of elliptical holes 320 having a minor axis of about 0.37 a as this typically provides low transmission. Coupling ridge waveguide 375 at line B provides a transmission coefficient greater than about 0.5 in the frequency band from about 0.24 c/a to about 0.28 c/a. Coupling ridge waveguide 375 at line A provides a transmission coefficient greater than about 0.5 in the frequency band from about 0.26 c/a to about 0.285 c/a. Coupling ridge waveguide 375 at line C provides a tranmission coefficient of about 0.5 or less for all frequencies of interest as shown by curve 603.

Figure 6B:
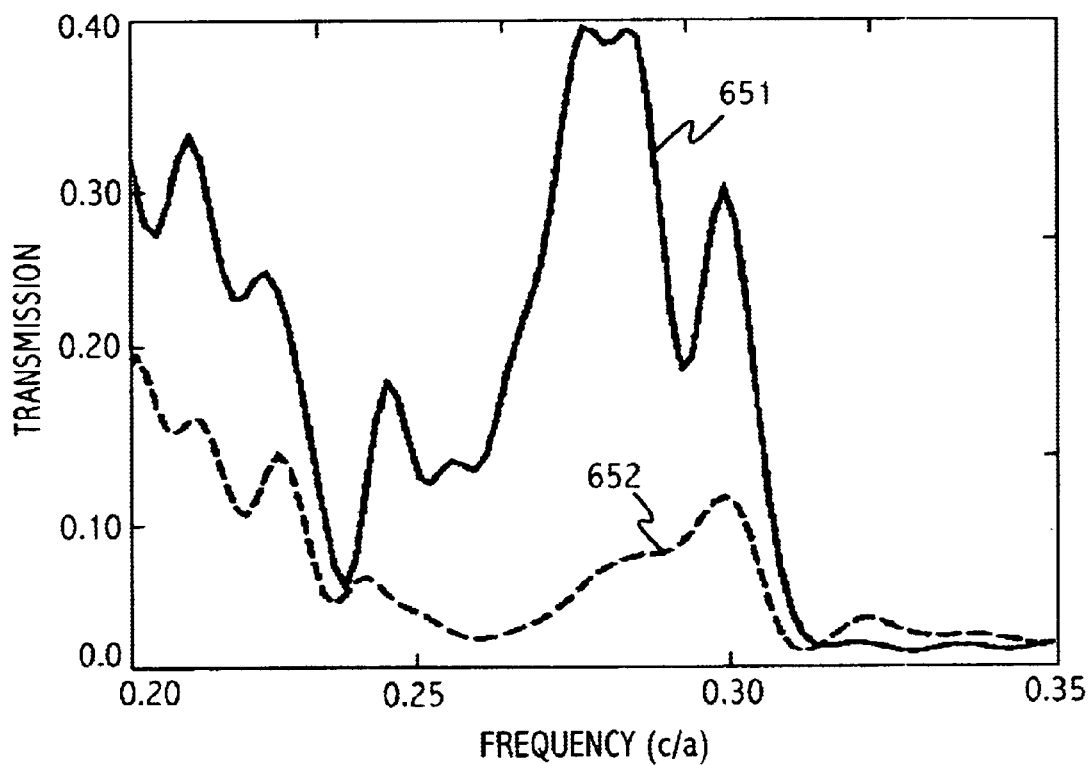
FIG. 6b shows a transmission versus frequency graph for a two-dimensional photonic crystal slab apparatus in accordance with the invention.

FIG. 6b shows the negative effect on transmission that occurs when elliptical holes 320 contact and overlap circular holes 310. Curve 651 shows the transmission for elliptical holes 320 with a semiminor axis of about 0.39 a and a semimajor axis of about 0.872 a. Curve 652 shows the transmission for elliptical holes 320 with a semiminor axis of about 0.41 a and a semimajor axis of about 0.917 a. In both cases, elliptical holes 320 contact and overlap circular holes 310. As the overlap between elliptical holes 320 and circular holes 310 increases (as the semiminor axis increases) it is apparent that transmission drops off rapidly due to decreased confinement of the wave.

Figure 6C:
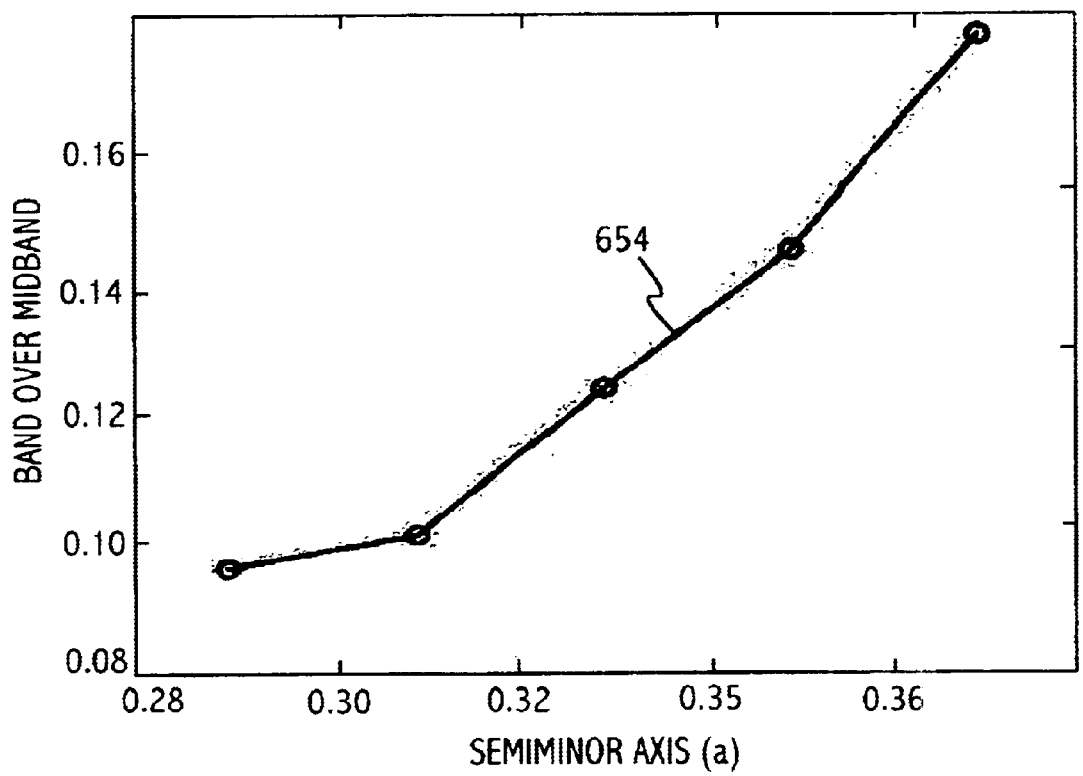
FIG. 6c shows a band over midband versus semiminor axis graph for an embodiment in accordance with the invention.

FIG. 6c shows the width of the waveguide band over the mid-band frequency versus the semiminor axis in units of the lattice constant, a with the ratio of the major axis to the minor axis fixed at about 2.236 for elliptical holes 320. Curve 654 shows that the maximum width of the mid-band frequency is about 0.176.

Figure 6D:
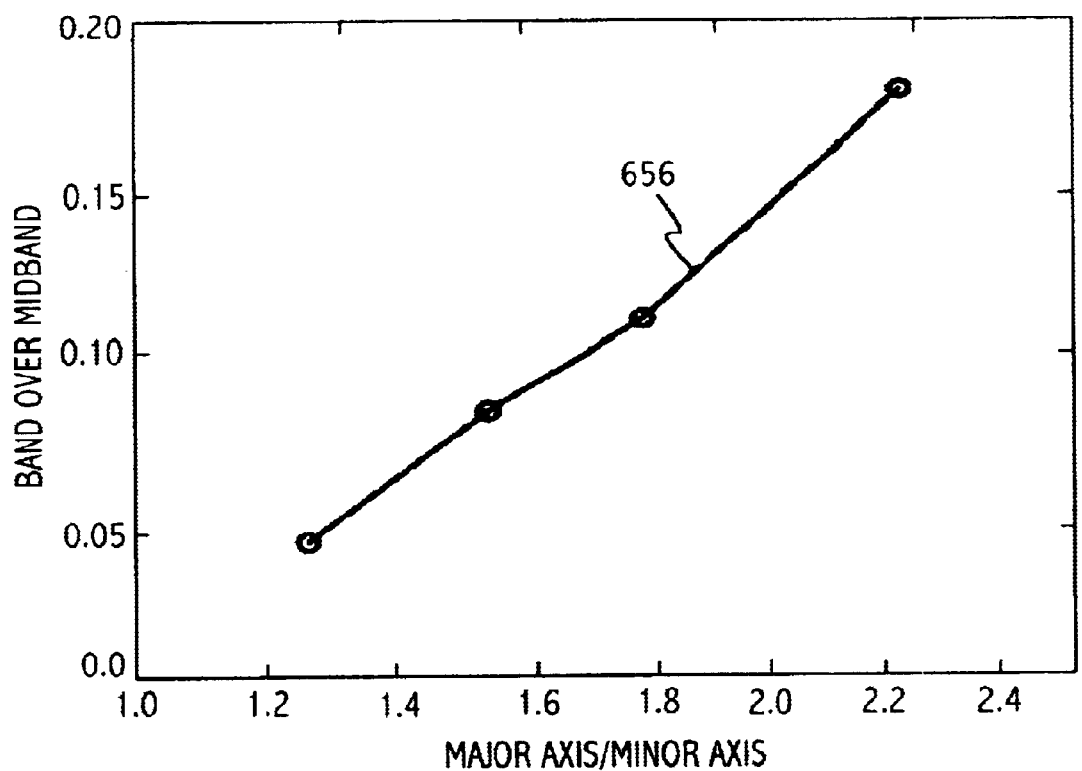
FIG. 6d shows a band over midband versus major axis to minor axis ratio for an embodiment in accordance with the invention.

FIG. 6d shows the width of the waveguide band over mid-band frequency versus the ratio of the major axis to the minor axis where the semiminor axis is fixed at about 0.37 a. Increasing the ratio of the major axis to the minor axis increases the bandwidth as shown by curve 656. In both FIGS. 6c and 6d, after the maximum bandwidth shown is reached, the transmission of photonic crystal slab apparatus 300 will decrease rapidly as elliptical holes 320 begin to overlap with circular holes 310 as indicated, for example, in FIG. 6b.

Figure 7:
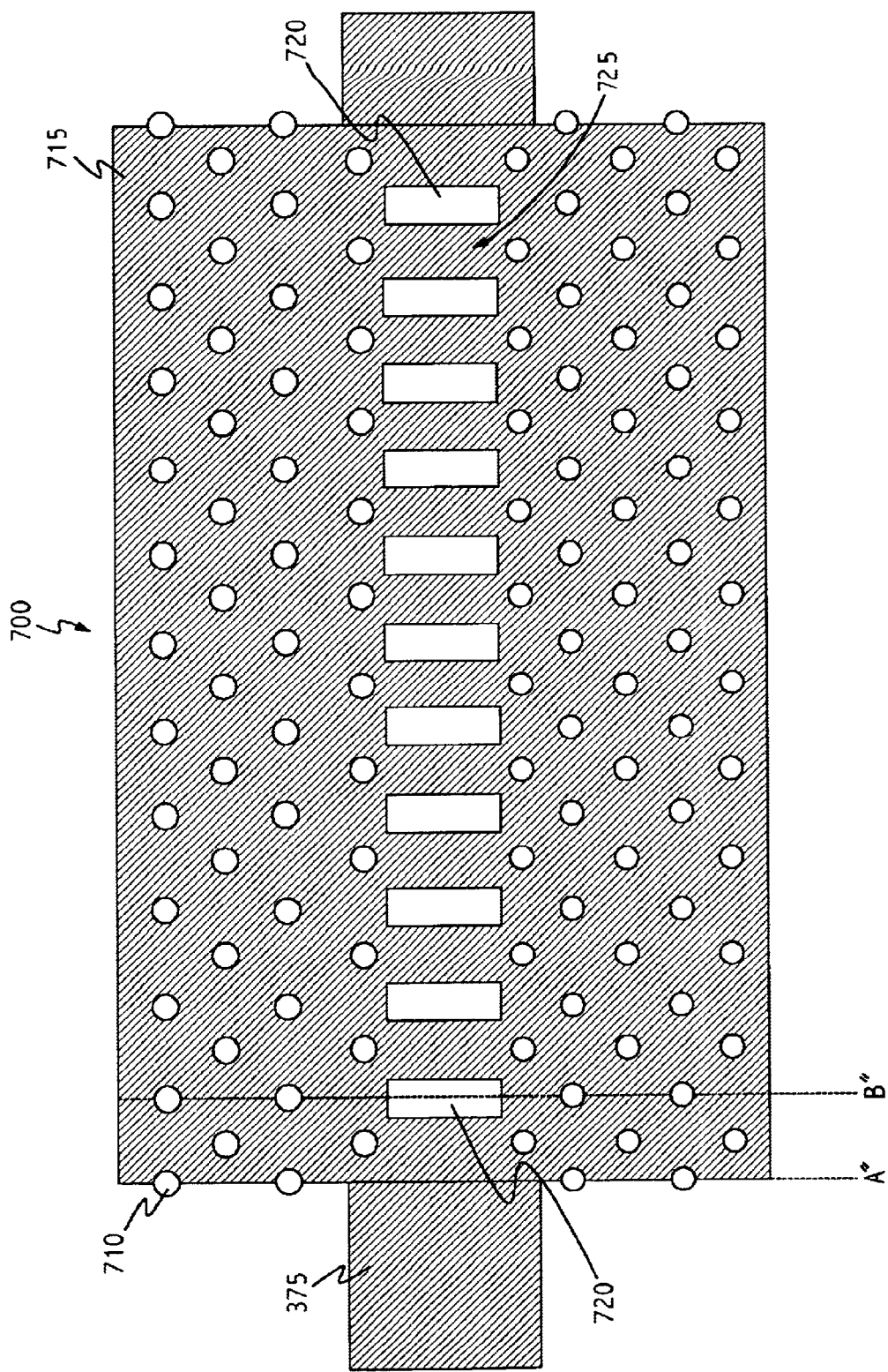
FIG. 7 shows a view of a two-dimensional photonic crystal slab apparatus in accordance with the invention.
Figure 8A:
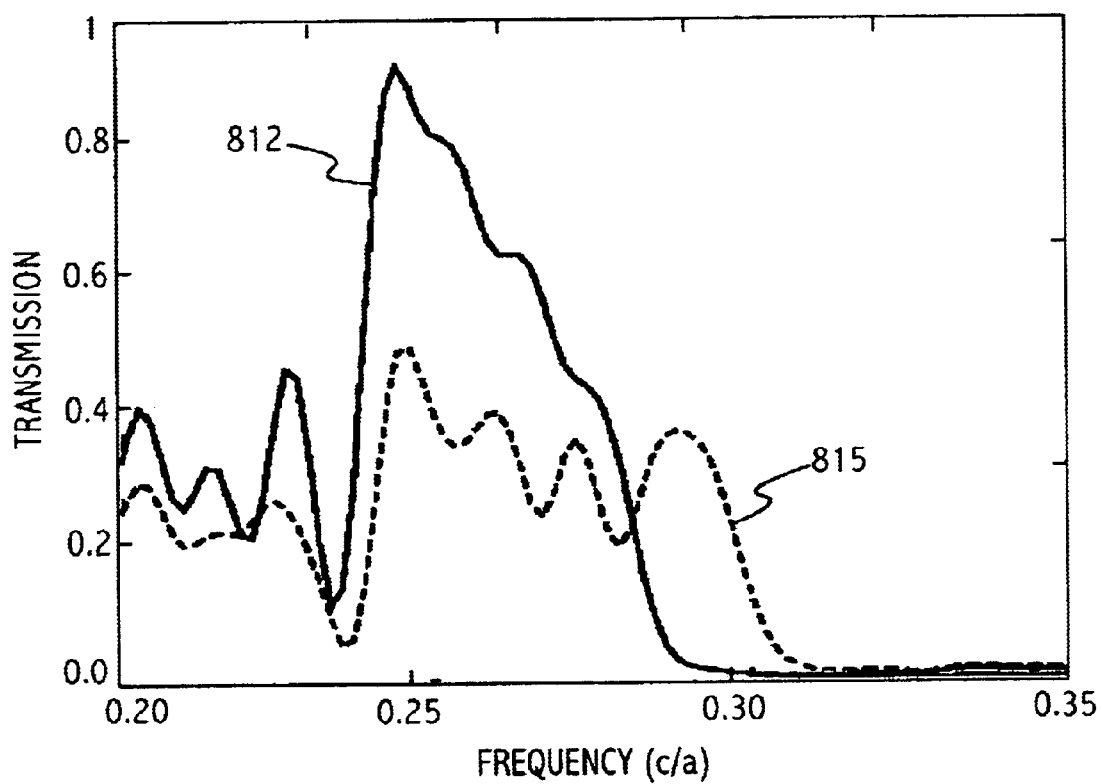
FIG. 8a shows a transmission versus frequency diagram for a two-dimensional photonic crystal slab apparatus in accordance with the invention.

The present invention is not limited to using elliptically shaped holes. For example, in accordance with an embodiment of the invention, elliptical holes 320 may be replaced by rectangles 720 to make photonic crystal slab apparatus 700 as shown in FIG. 7. Circular holes 710 have a radius of 0.3 a. FIG. 8a shows transmission versus frequency for ridge waveguide 375 coupled to photonic crystal slab 715 along the edge defined by line B" in FIG. 8a for both curves 812 and 815. Curve 812 shows transmission versus frequency for rectangles 720 having a short side of length of about 0.58 a and a long side of length about 1.3 a. Curve 815 shows transmission versus frequency for rectangles 720 having a short side of about 0.62 a and a long side to of about 1.38 a. Transmission for curve 815 is worse because rectangles 720 start to touch and overlap with circular holes 710.

Figure 8B:
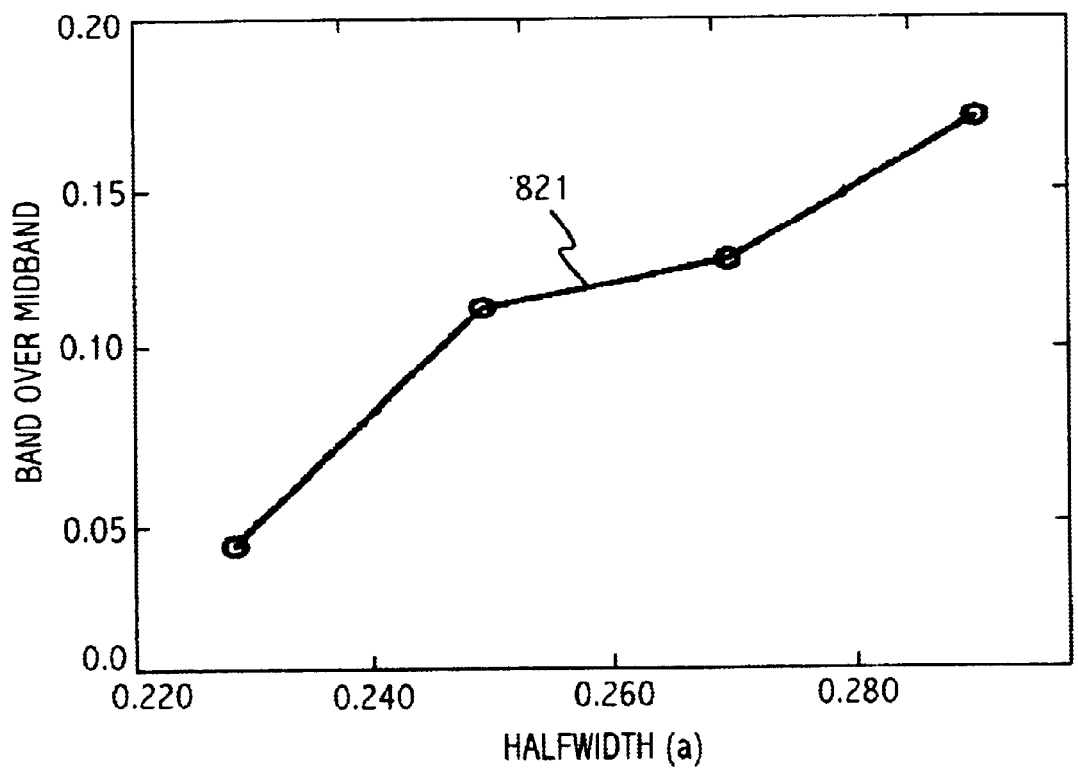
FIG. 8b shows a band over midband versus halfwidth graph for an embodiment in accordance with the invention.

FIG. 8b shows the width of the waveguide band over mid-frequency versus the half-width of rectangle 720 in units of the lattice constant, a with the ratio of rectangle length to width fixed at about 2.236. As curve 821 shows, the maximum bandwidth is about 0.164.

Figure 8C:
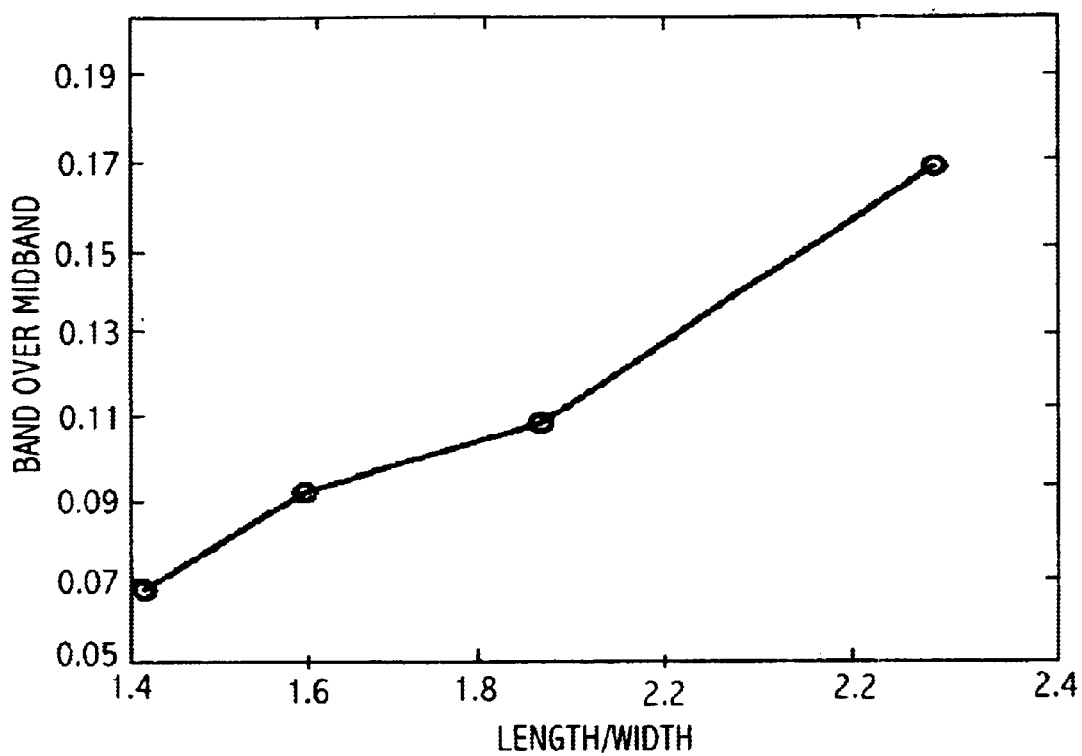
FIG. 8c shows a band over midband versus length to width ratio for an embodiment in accordance with the invention.

FIG. 8c shows the width of the waveguide band over mid-frequency versus the ratio of the length to the width for rectangle 720 and a rectangle halfwidth of about 0.29 a.

Figure 9A:
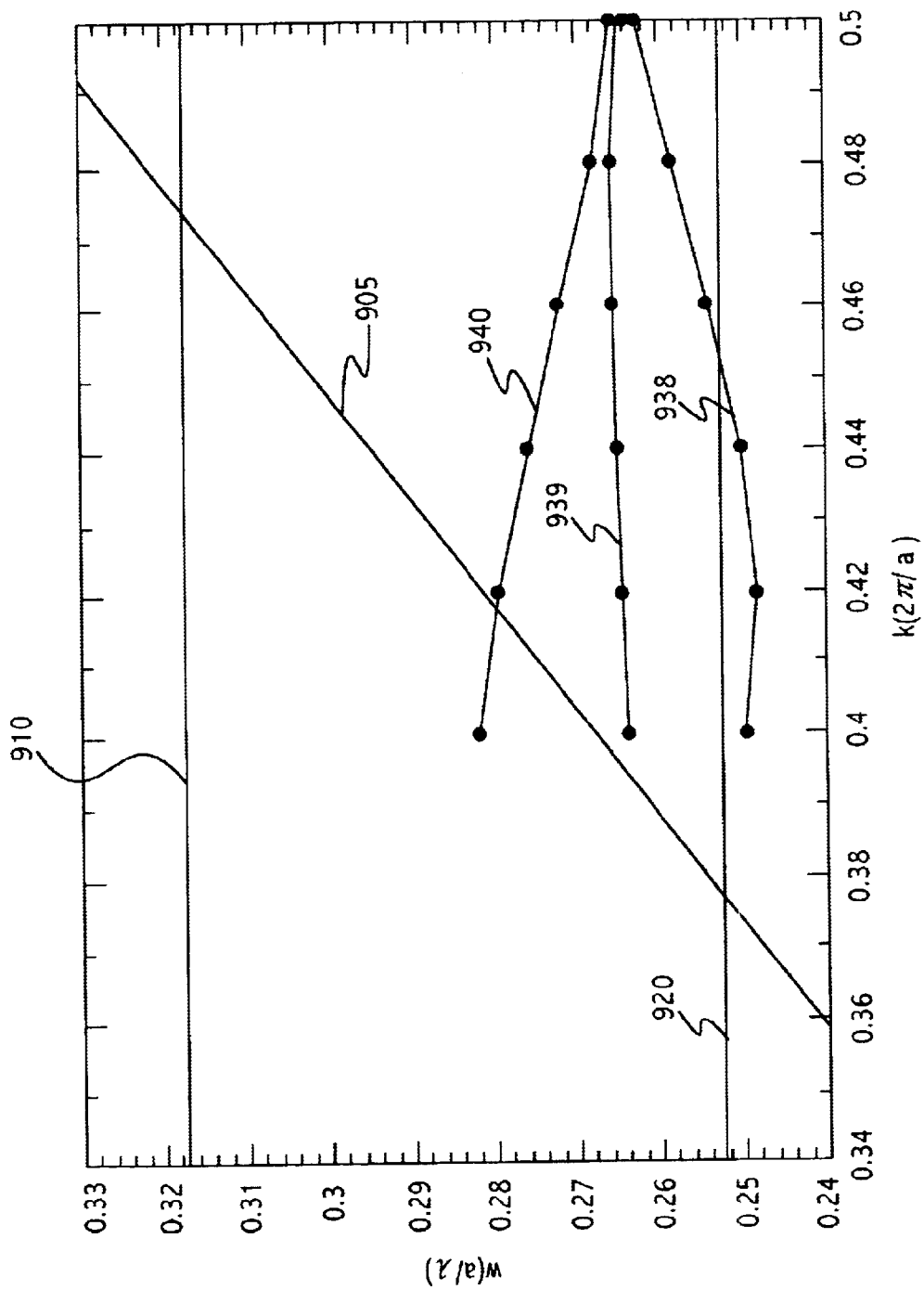
FIG. 9a shows the band structure for a two-dimensional photonic crystal slab apparatus in accordance with the invention.

FIG. 9a shows the band structure for photonic crystal slab apparatus 300 shown in FIG. 3. Solid lines 910 and 920 denote the band edges while line 905 marks the boundary of the lightcone. For the elliptical line defect in FIG. 3 there are three even modes 938, 939 and 940. Even mode 939 has low group velocities, however even modes 940 and 939 have higher group velocities.

Figure 9B:
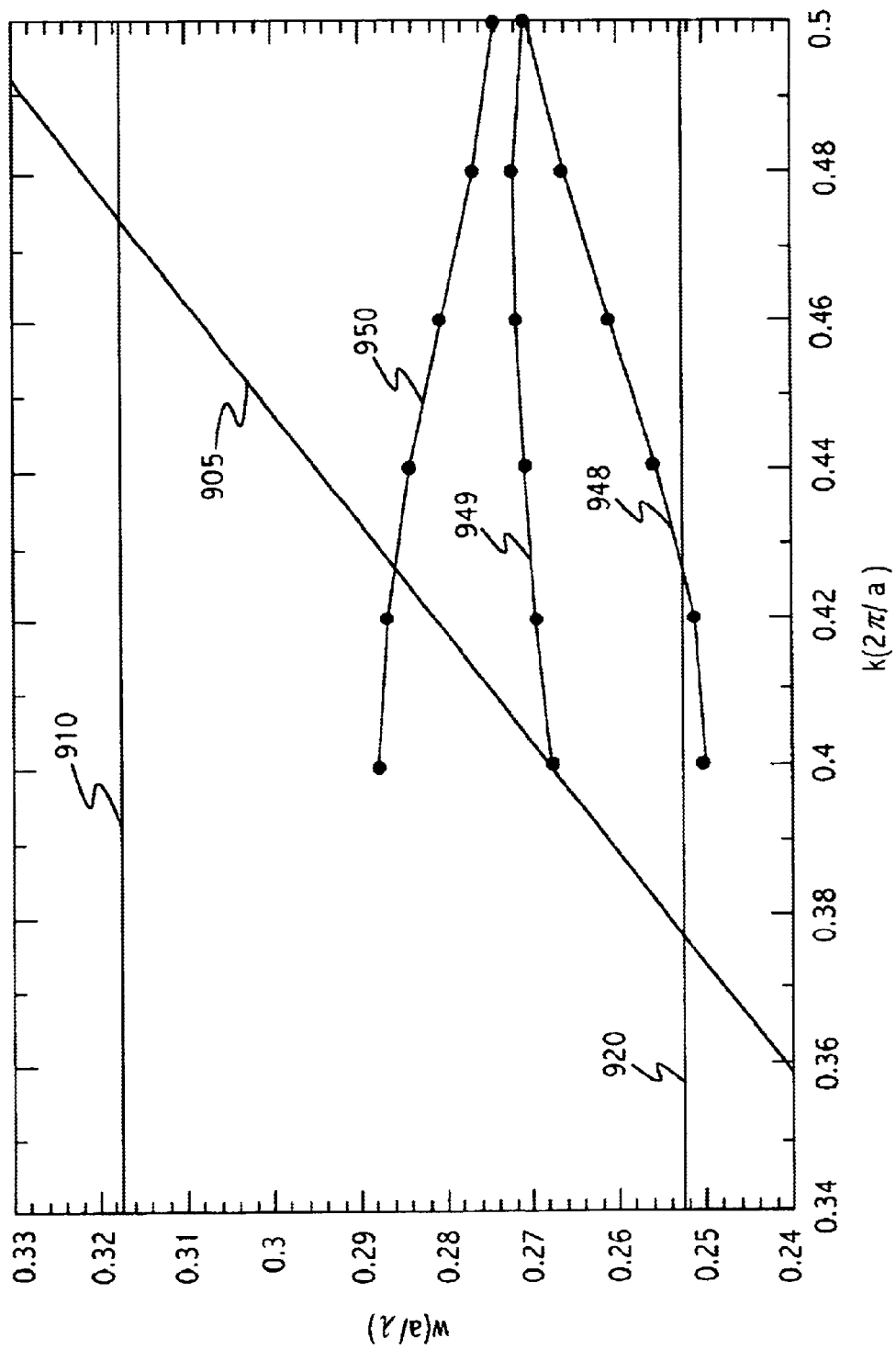
FIG. 9b shows the band structure for a two-dimensional photonic crystal slab apparatus in accordance with the invention.

FIG. 9b shows the band structure for photonic crystal slab apparatus 700 for rectangles 720 in FIG. 7 having a short side of about 0.58 a and a long side of about 1.3 a. For the rectangle line defect, even modes 948 and 949 have an overlap near the frequency of about 0.27 c/a which indicates mode mixing is present which is not desirable in single mode applications. Even mode 950 is comparable to even mode 940 in FIG. 9a.

Figure 9C:
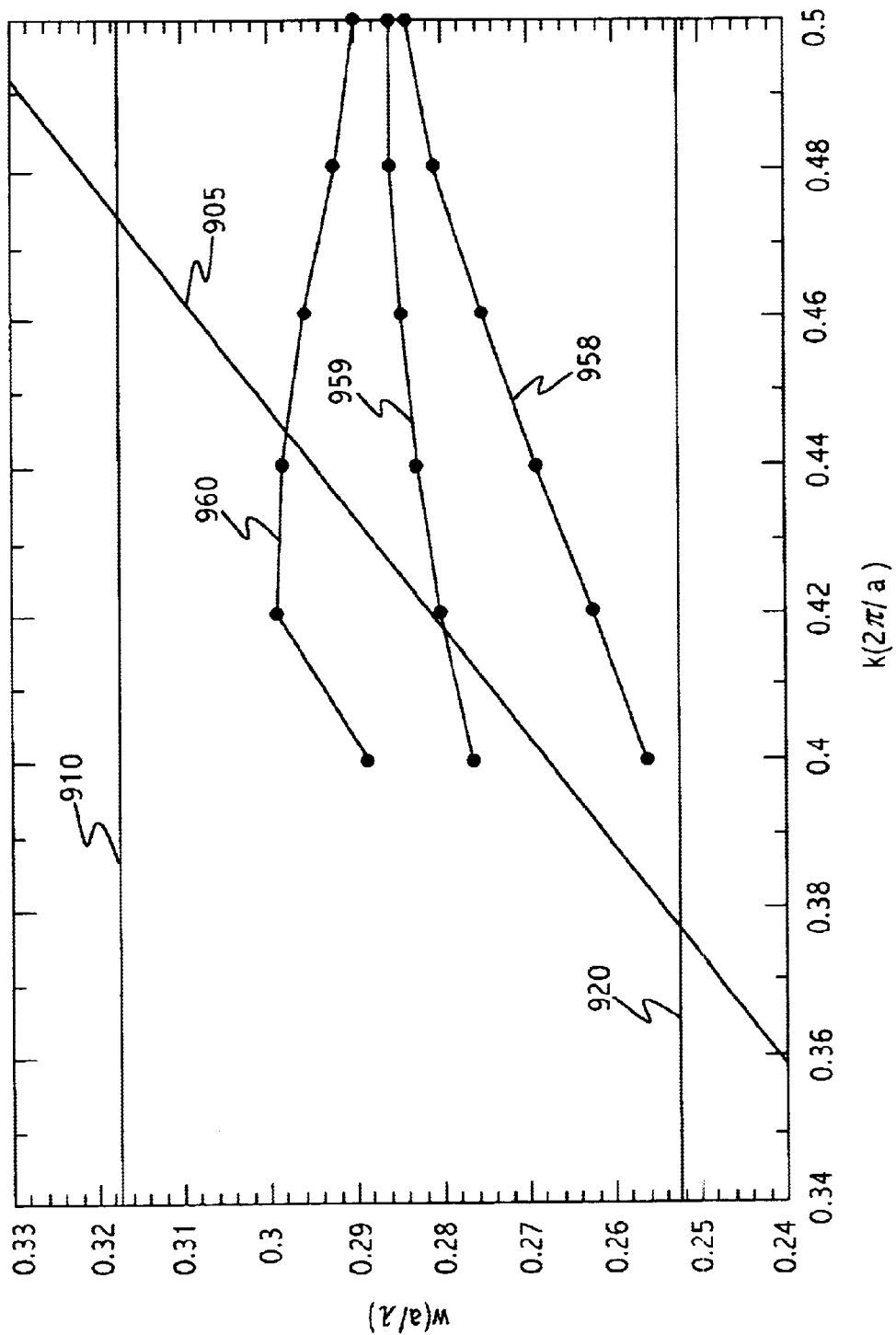
FIG. 9c shows the band structure for a two-dimensional photonic crystal slab apparatus in accordance with the invention.

FIG. 9c shows the band structure for photonic crystal slab apparatus 700 with rectangles 720 in FIG. 7 having a short side of about 0.62 a and a long side of about 1.38 a. Again three even modes 960, 959 and 958 are present. However, transmission is less effective for the configuration in FIG. 9c.

In accordance with the invention, elliptical holes 320 and rectangular holes 720 provide much wider waveguide bands than do circular holes 120. In all cases, transmission decreases rapidly when there is an overlap between noncircular holes such as elliptical holes 320 or rectangular holes 720. Transmission also decreases rapidly when there is an overlap between noncircular holes and circular holes 310 or 710. However, over 10% guiding bandwidth is achieved for a wide range of elliptical and rectangular shapes. Rectangle-like holes with rounded shapes close to neighboring holes also results in wide waveguide bands.

Figure 10A:
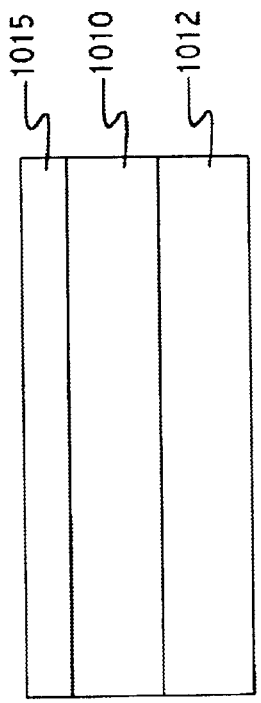
FIG. 10a show a side view of the initial structure for making an embodiment in accordance with the invention using a silicon on insulator wafer.
Figure 10B:
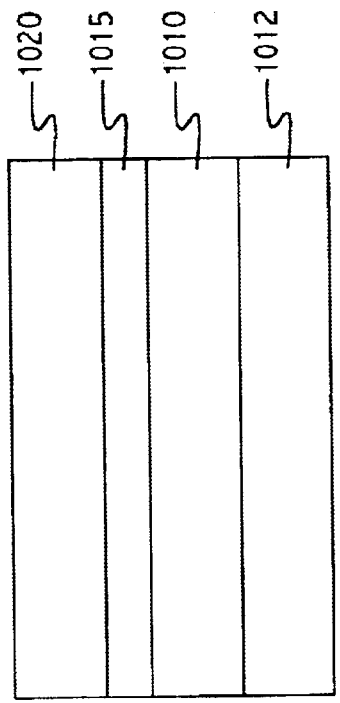
Figure 10C:
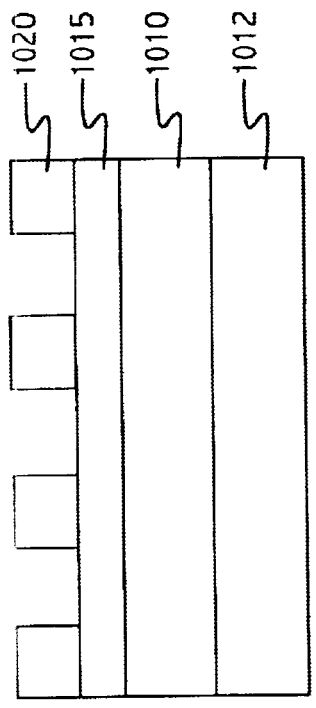
FIG. 10c shows the structure after patterning of the e-beam resist layer.

Photonic crystal slab apparatus 300 or photonic crystal slab apparatus 700 may be fabricated in accordance with an embodiment of the invention as shown in FIGS. 10a–10e. The initial structure is a silicon on insulator (SOI) structure having silicon layer 1010 and $SiO_2$ layer 1012. A photonic crystal structure is fabricated in Si layer 1010. Typically, thin $SiO_2$ layer 1015 is deposited over Si layer 1010 to serve as a mask layer for subsequent etching of Si layer 1010 as shown in FIG. 10a. E-beam resist layer 1020 is typically deposited over thin $SiO_2$ layer 1015 to a typical thickness of about 400 nm as shown in FIG. 10b. Resist layer 1020 is patterned to the desired lattice hole pattern using e-beam lithography as shown in FIG. 10c. Then, thin $SiO_2$ layer 1015 is etched using reactive ion etching to obtain the desired lattice hole pattern as shown in FIG. 10d. Following creation of the desired mask pattern, the lattice pattern etched in $SiO_2$ layer 1015 is transferred to Si layer 1010 by a controlled etch typically using HBr shown in 10e. Note that Si layer 1010 is overetched resulting in penetration into $SiO_2$ layer 1020. The completed two-dimensional photonic crystal slab apparatus after the controlled etch is shown in FIG. 10e in a side view.

Figure 11A:
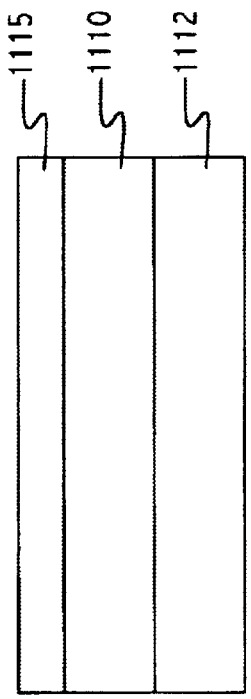
FIG. 11a shows a side view of the initial structure for making an embodiment in accordance with the invention using a GaAs substrate.
Figure 11B:
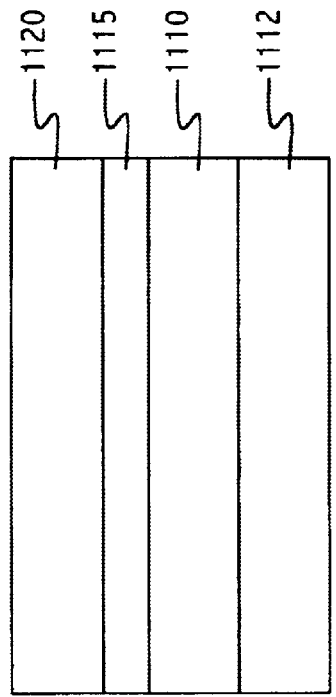
Figure 11C:
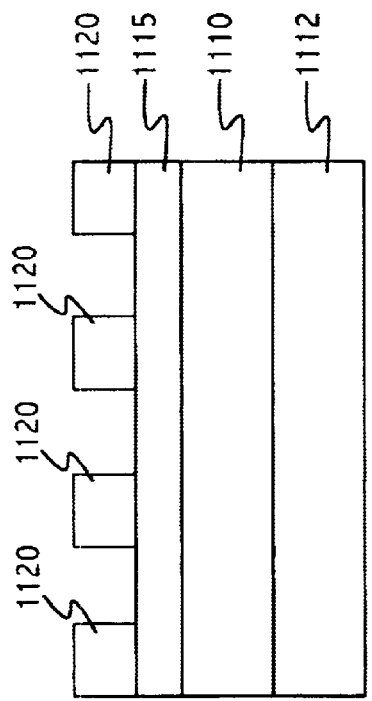
FIG. 11c shows the structure after patterning of the e-beam resist layer.
Figure 11D:
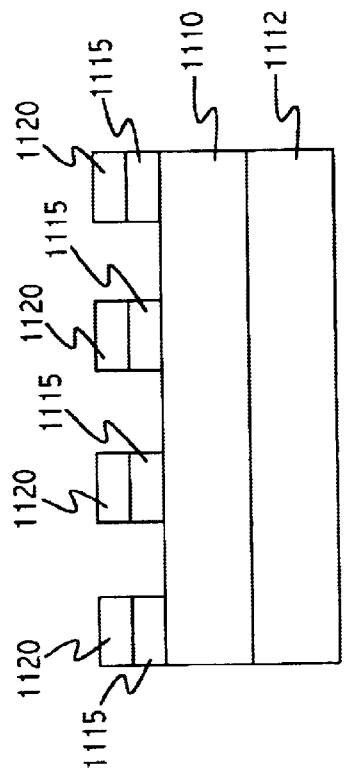
FIG. 11d shows the structure after etching of the $SiO_2$ layer to form a mask for subsequent etching of the GaAs layer.
Figure 11E:
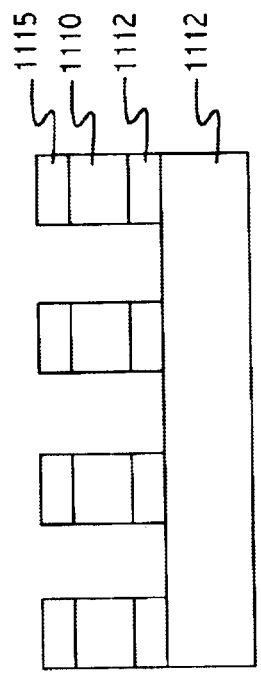
FIG. 11e shows the structure after etching of the GaAs layer.
Figure 11F:
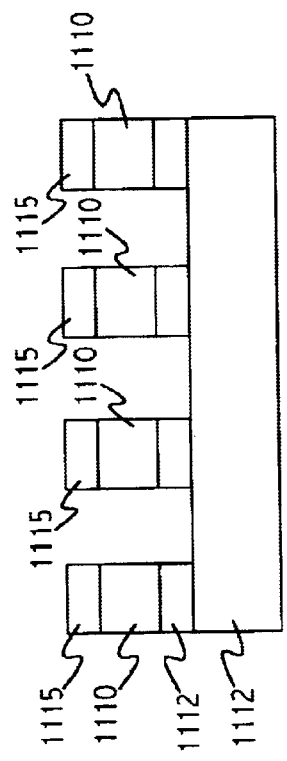
FIG. 11f shows the completed structure after oxidation of the aluminum containing layer.

Photonic crystal slab apparatus 300 or photonic crystal slab apparatus 700 may be fabricated in accordance with an embodiment of the invention as shown in FIGS. 11a–11f. Typically, thin $SiO_2$ layer 1115 is deposited over GaAs layer 1110 to a typical thickness of about 200 nm to serve as a mask layer for subsequent etching of GaAs layer 1110 as shown in FIG. 11a. GaAs layer 1110 is attached to AlGaAs layer 1112. E-beam resist layer 1120 is deposited over thin $SiO_2$ layer 1115 to a typical thickness of about 400 nm as shown in FIG. 11b. Resist layer 1120 is patterned to the desired lattice hole pattern using e-bean lithography as shown in FIG. 10c. Then, thin $SiO_2$ layer 1115 is etched using reactive ion etching with $CHF_3$ to obtain the desired lattice hole pattern as shown in FIG. 11d. Following creation of the desired mask pattern, the lattice pattern etched in $SiO_2$ layer 1115 is transferred to GaAs layer 1110 by a reactive ion etch typically using $Cl_2$ as shown in FIG. 11e. A steam oxidation process is then performed of AlGaAs layer 1112 to convert layer 1112 to $AlO_2$ to obtain the proper refractive index ~1.5

While the invention has been described in conjunction with specific embodiments, it is evident to those skilled in the art that many alternatives, modification, and variations will be apparent in light of the foregoing description. According, the invention is intended to embrace all other such alternatives, modifications, and variations that fall within the spirit and scope of the appended claims.

We claim:

1. A two-dimensional photonic crystal slab apparatus comprising:

a photonic crystal slab comprising a two-dimensional periodic lattice of substantially circular holes with a lattice constant;

a substantially straight line of defects defining a waveguide in said two-dimensional periodic lattice, said straight line of defects comprising holes having a substantially noncircular cross-section, said holes having a size and arrangement such that said holes do not physically contact said circular holes.

2. The apparatus of claim 1 wherein said substantially circular holes each have a radius that is about 0.3 of said lattice constant.

3. The apparatus of claim 1 wherein said substantially non-circular cross-section is an ellipse.

4. The apparatus of claim 3 wherein said ellipse has a major axis and a minor axis such that the ratio of said major axis to said minor axis is between about 2 and 2.4.

5. The apparatus of claim 1 wherein said substantially non-circular cross-section is a rectangle.

6. The apparatus of claim 1 wherein said photonic crystal slab is comprised of silicon.

7. The apparatus of claim 1 wherein said two-dimensional periodic lattice is a triangular lattice.

8. The apparatus of claim 1 wherein said circular holes are filled with air.

9. The apparatus of claim 1 wherein said photonic crystal slab is comprised of GaAs.

10. A method for making a two-dimensional photonic crystal slab apparatus comprising:

providing a photonic crystal slab comprising a two-dimensional periodic lattice of substantially circular holes with a lattice constant;

creating a substantially straight line of defects to define a waveguide in said two-dimensional periodic lattice, said straight line of defects comprising holes having a substantially noncircular cross-section, said holes having a size and arrangement such that said holes do not physically contact said circular holes.

11. The method of claim 10 wherein said substantially circular holes each have a radius that is about 0.3 of said lattice constant.

12. The method of claim 10 wherein said substantially non-circular cross-section is an ellipse.

13. The method of claim 12 wherein said ellipse has a major axis and a minor axis such that the ratio of said major axis to said minor axis is between about 2 and 2.4.

14. The method of claim 10 wherein said substantially non-circular cross-section is a rectangle.

15. The method of claim 10 wherein said photonic crystal slab is comprised of silicon.

16. The method of claim 10 wherein said two-dimensional periodic lattice is a triangular lattice.

17. The method of claim 10 wherein said circular holes are filled with air.

18. The method of claim 10 wherein said photonic crystal slab is comprised of GaAs.

* * * * *